United States Patent [19]
Asensio et al.

[11] Patent Number: 5,652,863
[45] Date of Patent: Jul. 29, 1997

[54] GRAPHICAL METHOD OF MEDIA PARTITIONING ON A HARD DISK

[75] Inventors: Miguel Fernando Asensio, Boynton Beach; Pedro C. Rodriguez, Loxahatchee; William Robert Smith, Boca Raton, all of Fla.; Vickie Elaine Szarek, Cary, N.C.; Duane Stephen Wood, Boynton Beach, Fla.

[73] Assignee: International Business Machines Corporation, Armonk, N.Y.

[21] Appl. No.: 486,774

[22] Filed: Jun. 7, 1995

[51] Int. Cl.[6] ............................................. G06F 3/00
[52] U.S. Cl. .................... 395/497.04; 395/653; 395/349
[58] Field of Search .......................... 395/155–161, 395/326–358, 712, 494.01–494.04, 456, 966, 651–653

[56] References Cited

U.S. PATENT DOCUMENTS

| | | | |
|---|---|---|---|
| 4,809,170 | 2/1989 | Leblang et al. | 395/700 |
| 4,896,291 | 1/1990 | Gest et al. | 395/353 |
| 4,899,136 | 2/1990 | Beard et al. | 395/156 |
| 4,939,507 | 7/1990 | Beard et al. | 395/156 |
| 5,095,420 | 3/1992 | Eilert et al. | 395/419 |
| 5,109,485 | 4/1992 | Smith, Jr. | 395/600 X |
| 5,237,460 | 8/1993 | Miller et al. | 395/497.04 |
| 5,257,379 | 10/1993 | Cwiakala et al. | 395/700 |
| 5,581,797 | 12/1996 | Baker et al. | 395/356 |

*Primary Examiner*—Mark R. Powell
*Assistant Examiner*—John E. Breene
*Attorney, Agent, or Firm*—Calfee, Halter & Griswold LLP

[57] ABSTRACT

A method of graphical representation of media partitioning and fixed disk data management utilizes manipulable graphical computer images to represent hard disk data storage space in a computer. The graphical images are manipulated by the user to define and position target installation partitions and to reposition existing partitions upon a hard disk. A partitioning subroutine program partitions and/or repartitions the disk according to the relative position of graphically selected partitions upon the image of the disk. The graphic images of the hard disk and the data partitions thereon are labeled with identifying legends to assist the user in selecting and manipulating the images.

4 Claims, 1 Drawing Sheet

GRAPHICAL METHOD OF MEDIA PARTITIONING ON A HARD DISK

FIELD OF THE INVENTION

The present invention pertains generally to configuration task management and, in particular, to graphical methods of managing and controlling partitioning of fixed disks.

BACKGROUND OF THE INVENTION

In order for an operating system to be installed on a computer hard disk, partitions must be placed upon sectors of the disk by an operating system such as DOS®. Such file systems typically present the user with a list of known partitions and request the user to select an existing partition or create a new partition. In order to create a new partition, the user must delete existing partitions to create sufficient free space prior to creating a new partition, and thereby risk deleting all files in an active partition. Programs such as FDISK™ assist users, through text based interfaces, in creating or deleting partitions and creating extended partitions with logical drives and setting the active partition. Although such programs provide user prompts and display disk format data in table form, they do not provide users with easily comprehendible and manipulable representation of the disk format, such as a graphical representation of free disk space and unused partitions.

SUMMARY OF THE INVENTION

The present invention provides a graphical method of partitioning and repartitioning hard disk storage devices by use of graphical images which represent physical locations of software upon a disk.

In accordance with one aspect of the invention, a method of graphical representation and management of total hard disk data storage space uses a graphical image of a hard disk generated for display on a screen of a computer system, and graphical partitions of disk space are represented by marked divisions of the total disk space. An overlay image representing a target installation partition or repartition is generated for superposed display on the graphical representation of the total disk space. The size of the target installation partition overlay can be graphically increased or decreased by the user by control arrows or a mouse. Once the position and size of the target installation partition overlay is selected, the hard disk is automatically repartitioned according to the graphical representation by a repartitioning routine such as FDISK™ of the DOS™ and OS/2™ operating systems.

These and other aspects of the invention are described below in detail with reference to the accompanying Figure(s).

DETAILED DESCRIPTION OF A PREFERRED EMBODIMENT

Figure 1:
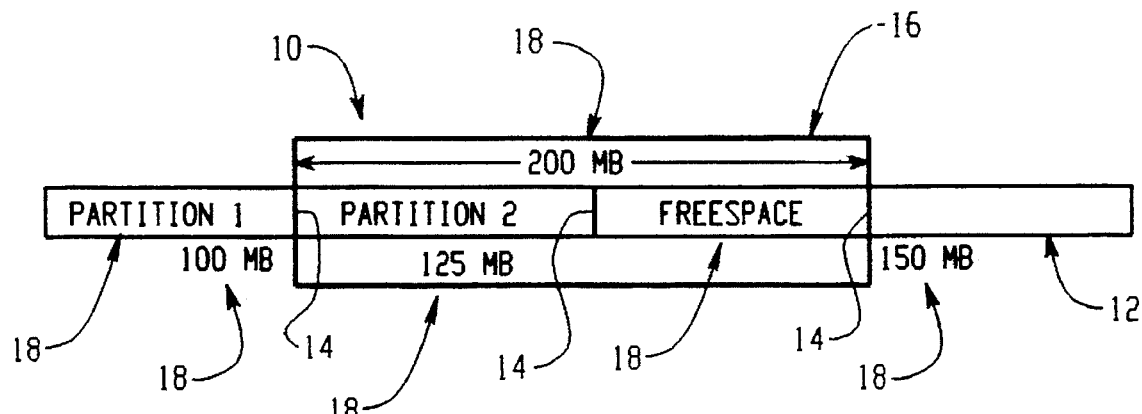
FIG. 1 illustrates an embodiment of a screen display generated in accordance with the graphical method of media partitioning of the present invention.

As shown in FIG. 1, a graphic display 10 generated by standard graphical primitives includes for example a horizontal bar 12 which represents an entirety of disk area storage space available for partitioning. Dividers 14 of the horizontal bar demarcate the relative boundaries of existing partitions and free space on the disk. A manipulable overlay image 16, graphically representing a target installation partition, is displayed superimposed over the horizontal bar 12 to present the user with a relational image of an amount of disk space allocable to the target installation partition, including and relative to existing partitions and free space. The user selects and enters the target installation partition(s), including the size (for example in megabytes) as physically represented by the length of overlay image 16 relative to the total length of horizontal bar 12, and moves the overlay 16 laterally relative to horizontal bar 12 to graphically select the position of the target installation partition upon the disk. For example, the size of the target installation overlay, and its position relative to the horizontal bar, can be controlled or manipulated by control arrow keys and/or by a mouse.

Inputs which correspond to the graphical representation and manipulation of target installation partitions are passed or served to an associated utility program such as FDISK™ of the DOS or OS/2 operating systems automatically repartitions the disk according to the graphical representation including partitions in free disk space. To control movement of disk data graphically represented by selected and moved partitions, programming techniques for automatically mapping selected pieces of information between storage locations are described in U.S. Pat. No. 5,095,420, the disclosure of which is incorporated herein by reference. When the automatic partitioning and/or repartitioning is completed, the newly created disk partitions are also graphically displayed by appropriate relocation of dividers 14 on display 10. By this method the user can visually and graphically select or change the status, type and size of hard disk partitions.

As further shown in FIG. 1, suitable legends or labels 18 are provided on the graphic display at appropriate locations such as the number of the partition and a drive letter associated with each partition; the active/inactive status of the partition; whether the partition is a primary partition, an extended partition, or a partition of a different operating system; a volume label of a primary partition; the size of each partition (in megabytes); the type of file system being used on the partition; and the percentage of the current disk that each partition occupies.

Figure 2:
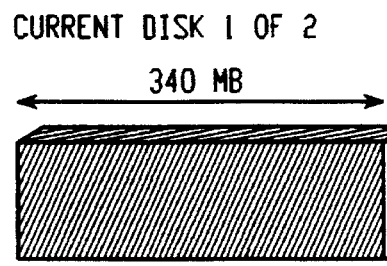
FIG. 2 illustrates an alternate format for a screen display in accordance with the present invention.

As shown in FIG. 2, an alternate format for graphically displaying hard disk storage space, explanatory text 20 may accompany the disk graphic display 10, along with file system details 22, and control key functions 24 to manipulate the image into a desired disk configuration.

For extended partitions containing logical drives, a secondary graphical screen may be generated to display a labelled graphical representation of similar information on the logical drives. The secondary screen could also indicate by label the total extended partition size, in megabytes. The labels may further indicate whether a partition has been formatted or reformatted.

What is claimed is:

1. A method of graphically representing and displaying and controlling media partitions upon a hard disk of a computer, the method comprising the steps of:

generating a graphical screen display image which graphically represents data storage space on a computer hard disk, said screen display comprising graphic divisions of said data storage area which represent locations of existing partitions of said disk relative to a total disk area, and generating a moveable overlay image on said screen display which represents a target installation partition, said overlay image moveable by user control relative to and over said image of a computer hard disk, whereby said moveable overlay image may be selectively positioned relative to said image of a computer hard disk to graphically select a position upon a hard disk at which a partition is to be installed.

2. The method of claim 1 further comprising graphical labels located upon or adjacent said graphical image of a hard disk area and said moveable overlay image, said labels displaying information on size, type and status of partitions of said displayed disk area image.

3. The method of claim 1 further comprising the step of graphically displaying partitions or repartitions of a hard disk performed by a disk partitioning program according to the graphical representation of disk data storage space.

4. The method of claim 1 further comprising the step of graphically displaying hard disk partitions containing logical drives and labels on partitions which indicate the presence of logical drives.

* * * * *